United States Patent [19]

Wannenwetsch

[11] Patent Number: 5,040,412
[45] Date of Patent: Aug. 20, 1991

[54] EVALUATION OF A FLUCTUATING VARIABLE

[75] Inventor: Peter Wannenwetsch, Stuttgart, Fed. Rep. of Germany

[73] Assignee: Robert Bosch GmbH, Stuttgart, Fed. Rep. of Germany

[21] Appl. No.: 460,941
[22] PCT Filed: Jul. 1, 1988
[86] PCT No.: PCT/EP88/00584
 § 371 Date: Mar. 1, 1990
 § 102(e) Date: Mar. 1, 1990
[87] PCT Pub. No.: WO90/00253
 PCT Pub. Date: Jan. 11, 1990

[51] Int. Cl.$^5$ .......................... G01M 15/00
[52] U.S. Cl. .................... 73/116; 364/431.07
[58] Field of Search .................... 73/116, 510; 364/431.07, 565, 566; 123/333; 324/178

[56] References Cited

U.S. PATENT DOCUMENTS 4,281,388 7/1981 Friend et al. ................ 364/565
4,779,213 10/1988 Luitje ........................... 364/565

FOREIGN PATENT DOCUMENTS 0133426 2/1985 European Pat. Off. .

Primary Examiner—Jerry W. Myracle
Attorney, Agent, or Firm—Walter Ottesen

[57] ABSTRACT

To obtain an input speed signal ($U_n$) for use as a feedback signal in an electronic diesel control (EDC), averages are taken by a component (12) of successive speed signals (n) produced by reference marks (BM) on the engine crankshaft. An extrapolator (10) estimates, by linear extrapolation, the average value for a given instant from the last average produced by the component (12) and from the previously calculated average stored in a memory (14).

Higher frequency speed fluctuations due to the momentary engine combustion pressures are eliminated from the output signal ($U_n$) while avoiding any significant phase delay between the input (n) and output ($U_n$) of the lower frequency fluctuations arising owing to the existence of the oscillatory system comprising the engine and its resilient mounting.

6 Claims, 2 Drawing Sheets

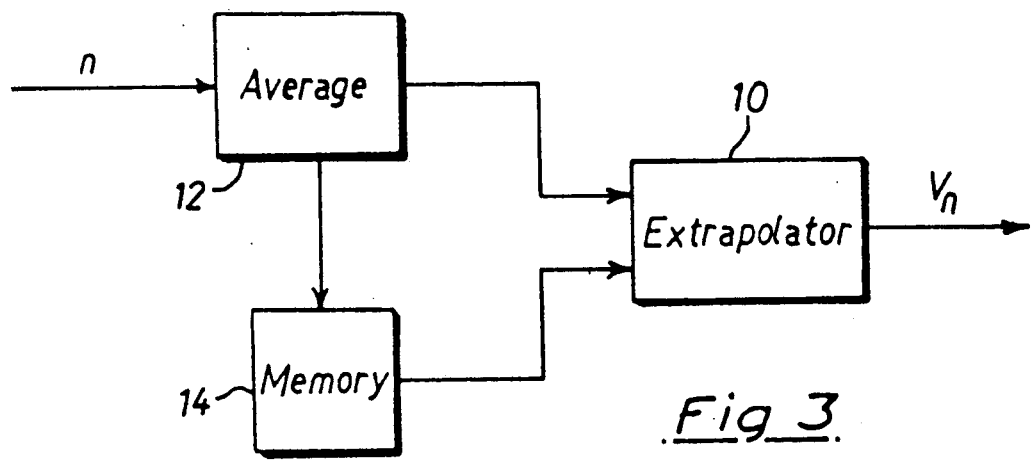
Fig_3.
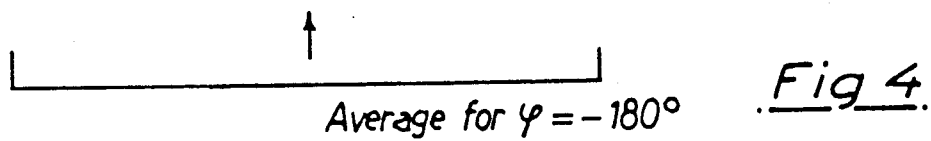
Fig_4.
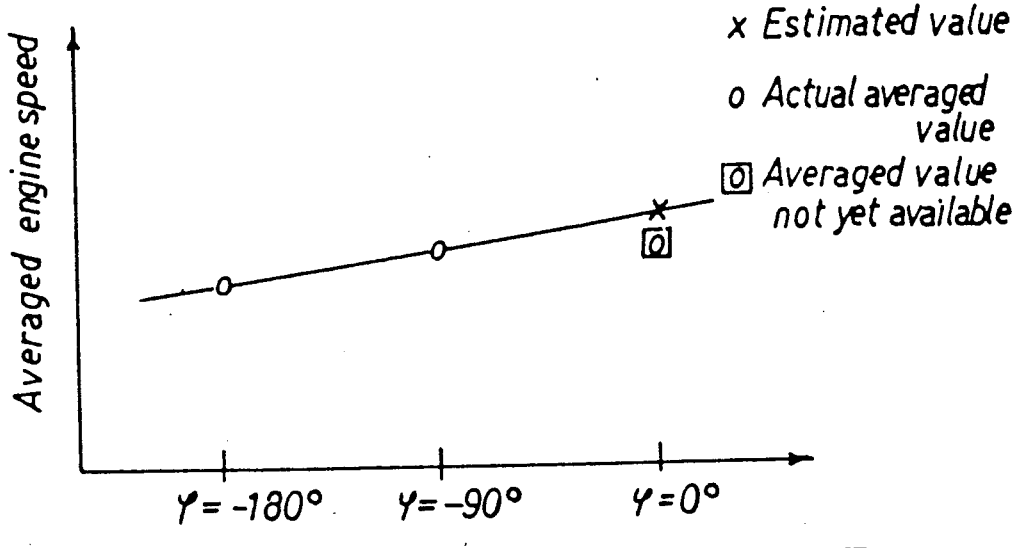
Fig_5.

EVALUATION OF A FLUCTUATING VARIABLE

FIELD OF THE INVENTION

The invention relates to a method of evaluating a fluctuating variable, particularly the speed of a diesel engine having electronic diesel control. In the method, averages of instantaneous measured values of the fluctuating variable are calculated. The invention also relates to a device for evaluating a fluctuating variable, particularly engine speed (n) for the electronic control of a diesel engine.

BACKGROUND OF THE INVENTION

In the speed evaluation in an electronic diesel control (EDC) for diesel engines, it is known to use the so-called "segment" method in which engine speed is calculated by measuring the time interval between the passing of two successive marks (reference marks) on the engine crankshaft, these marks being equally angularly spaced. Four marks are provided for a four cylinder engine. During idling, the engine speed tends to fluctuate widely at a relatively low frequency, e.g. 5 Hz, due to the resilient mounting of the engine on the vehicle body or chassis. It is an object of the EDC to damp or suppress these low frequency speed fluctuations but superimposed on these low frequency fluctuations is a higher frequency fluctuation, e.g. 25 Hz for a four stroke four cylinder engine rotating at 750 r.p.m. This is due to the fluctuating torque produced by the combustion pressures developed in the individual engine cylinders. Using the known method, the output speed signals are almost in phase with the perfect 5 Hz waveform from which the 25 Hz frequency has been eliminated. However, the output speed signals still possess the 25 Hz component which is disadvantageous for the EDC, inasmuch as it is impossible for the EDC to compensate for the speed fluctuations due to the individual momentary combustion pressures. The 25 Hz component can be effectively eliminated by taking averages of the input speed signals but this leads to a phase delay between the perfect 5 Hz waveform and the output waveform, because the average pertaining to one reference mark cannot be calculated until a subsequent reference mark has passed.

EP-A-0 133 426 describes a method of obtaining an average value of an almost periodically fluctuating signal, such as the angular velocity of the crankshaft of a diesel engine. To obtain a tone average, it is necessary to take the coverage, such as a running average, over one or several complete periods of fluctuation. However, when the engine speed changes suddenly, a corresponding change is not reflected in a corresponding sudden change in the average value as taken but only in a gradual change. To avoid this, EP-A-0 133 426 proposes to store the angular velocity signal at discrete points and to process the stored signal values later, e.g., by comparing the stored signal values with later actual signal values. Such comparison, in the event of a change in engine speed, results in a transient deviation. A running average is also taken of the fluctuating signal representing the angular velocity of the crankshaft and any transient deviation is added to this running average to obtain an output value which accurately represents the average engine speed at any given time. Disadvantages of the method of EP-A-0 133 426 are that it requires a large storage capacity and maybe additional memory components, special measures, with resulting expense, must be taken to ensure that the stored angular velocity values and the actual values with which they are compared are in synchronism with one another, requiring additional components, and the comparison of the stored and actual values representing the course of the fluctuating signal demands large computer capacity and the large computation times offset the advantage of the method in that a rapid engine speed response is obtained.

SUMMARY OF THE INVENTION

The disadvantages described above are avoided by the method of the invention wherein averages of instantaneous measured values of the fluctuating variable are calculated and the instantaneous averaged value of the fluctuating variable is estimated by extrapolation for at least the last two averages calculated. The device includes a calculating component for calculating averages of the fluctuating variable and a memory for storing at least one previously calculated average. An extrapolating circuit is provided for estimating the instantaneous averaged value of the variable by extrapolation from the average just calculated by the calculating component and the average or averages stored in the memory. The extrapolation of averages virtually eliminates the phase delay between the output and input in the case of the low frequency fluctuations and the higher frequency fluctuations are almost absent from the output.

A linear extrapolation from two successive averages of three successive input signals is very simple to carry out and involves a minimum of components. Thus, and according to another feature of the device of the invention, the calculating component calculates each average over the time interval during which the crankshaft rotates through an angle of 720° divided by the number of engine cylinders and the memory stores the immediately preceding calculated average and the extrapolating circuit extrapolates linearly from the just calculated and last stored averages.

BRIEF DESCRIPTION OF THE DRAWINGS

The invention is further described, by way of example, with reference to the accompanying drawings which relate to a four stroke, four cylinder diesel engine with EDC and in which:

FIG. 3 is a block diagram of a device according to the invention for evaluating a fluctuating engine speed;

FIG. 4 is a timing diagram to illustrate the calculation of averages in the preferred embodiment; and FIG. 5 is a graph showing the extrapolation of the averages in accordance with the invention.

DESCRIPTION OF THE PREFERRED EMBODIMENTS OF THE INVENTION

Figure 1:
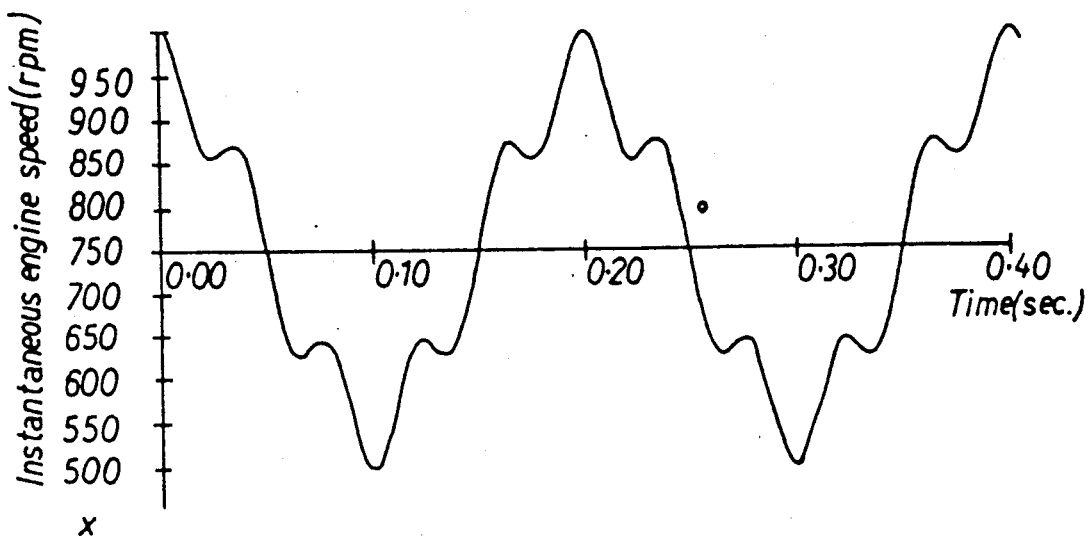
FIG. 1 is a graph of instantaneous engine speed plotted against time for idling at 750 r.p.m.

The engine of a motor vehicle is part of an oscillatory system due to the resilient mounting of the engine, the natural frequency of such system during idling being, for example, 5 Hz as assumed in FIG. 1. Thus, in the case of a diesel engine having EDC, there tends to be a positive speed signal feedback if there is any appreciable delay between the feedback signal and the instantaneous speed, resulting in fluctuations of the governed engine speed between wide limits; between 500 r.p.m. and 1000 r.p.m. in FIG. 1. However, superimposed on this low frequency fluctuation is a higher frequency fluctuation due to the momentary nature of the combustion pressures in the individual engine cylinders. In the case of a four stroke, four cylinder diesel engine rotating at 750 r.p.m, the frequency of such fluctuations is 25 Hz and this is shown in FIG. 1 superimposed on the lower 5 Hz frequency fluctuations.

The higher frequency fluctuations, in practice are impossible to eliminate, but the input speed signals n derived from four equi-angularly spaced reference marks BM on the engine crankshaft can be processed to remove the higher frequency fluctuations which could adversely affect the EDC. This can be done simply by taking averages but such results in a substantial phase delay between the input speed signal n and the output signal $U_n$ and the EDC is then unable to suppress the lower frequency oscillation.

Figure 2:
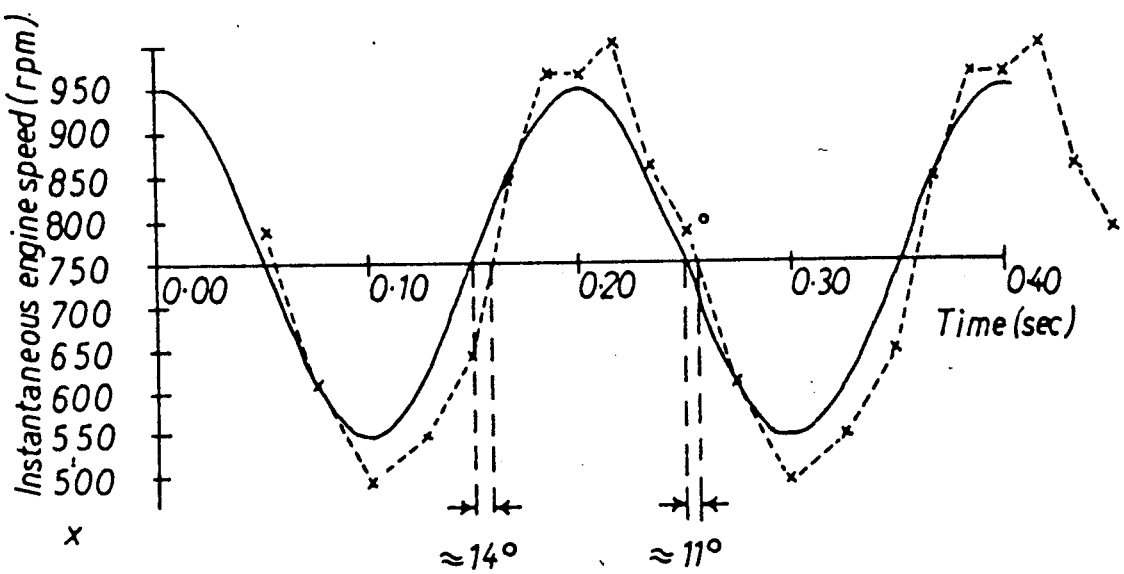
FIG. 2 is a comparable graph in which the higher frequency fluctuations have been eliminated in an idealized situation and showing the output obtained using the method and device of the invention.

FIG. 2 shows in full line a basic speed fluctuation which has been idealized into a perfect waveform of 5 Hz by the smoothing of the 25 Hz fluctuations. FIG. 2 shows in dotted lines the output signal $U_n$ obtained by the method and device of the invention from the input speed n shown in FIG. 1. It can be seen that the phase delay is very small, yet the 25 Hz ripple has disappeared.

This is achieved as shown in FIG. 3 by connecting an extrapolating circuit 10 to a component 12 for calculating averages to a memory 14 for storing the immediately previously calculated average. FIG. 4 shows the two average speed values from which an average value pertaining to a crankshaft angle $\alpha=0°$ is estimated by extrapolation. The average speed value calculated at $\alpha=0°$ is calculated from the time at $\alpha=-180°$, to the time at $\alpha=0°$ and is the average for $\alpha=-90°$. The immediately preceding average speed value is calculated from the time at $\alpha=-90°$, to the time at $\alpha=-270°$ and is the average for $\alpha=-180°$. These two speed values are used to estimate the average for $\alpha=0°$. This is shown in FIG. 5, wherein a straight line is drawn through the averaged instantaneous speeds for $\alpha=-180°$ and $\alpha=-90°$ to obtain an estimated averaged speed for $\alpha=0°$. The actual averaged speed for $\alpha=0°$ is also indicated but this cannot be deduced until the instant at which $\alpha=+90°$. This close approximation between the estimated fluctuations and the perfected fluctuations is illustrated in FIG. 2.

I claim:

1. A method of evaluating a fluctuating variable such as the speed of a diesel engine having electronic diesel control, the method comprising the steps of:

calculating a plurality of averages of instantaneously measured values of said variable; and, estimating the instantaneous averaged value of said variable by extrapolating from at least the last two calculated averages.

2. The method of claim 1, wherein said extrapolation is linear.

3. A device for evaluating a fluctuating variable such as the speed (n) of a diesel engine equipped with electronic diesel control, the device comprising:

calculating component means for calculating averages of said variable (n);

a memory for storing at least one previously calculated average; and, extrapolating circuit means for estimating the instantaneous averaged value of said variable by extrapolating from the average just calculated by said calculating component means and at least one average stored in said memory.

4. The device of claim 3, wherein said memory stores the immediately preceding calculated average and said extrapolating circuit means extrapolates linearly form the just calculated and last stored averages.

5. The device of claim 3, wherein said calculating means calculates each average over the time interval during which the crankshaft rotates through an angle of 720° divided by the number of engine cylinders.

6. The device of claim 5, wherein said memory stores the immediately preceding calculated average and said extrapolating circuit means extrapolates linearly from the just calculated and last stored averages.

* * * * *

UNITED STATES PATENT AND TRADEMARK OFFICE
CERTIFICATE OF CORRECTION

PATENT NO. : 5,040,412

DATED : August 20, 1991

INVENTOR(S) : Peter Wannenwetsch

It is certified that error appears in the above-identified patent and that said Letters Patent is hereby corrected as shown below:

In column 2, line 16: delete "for" and substitute -- from -- therefor.

In column 4, line 33: delete "form" and substitute -- from -- therefor.

Signed and Sealed this

Fourth Day of May, 1993

Attest:

MICHAEL K. KIRK

Attesting Officer

Acting Commissioner of Patents and Trademarks